(12) United States Patent
Gadkaree et al.

(10) Patent No.: US 9,318,273 B2
(45) Date of Patent: *Apr. 19, 2016

(54) HIGH VOLTAGE EDLC ELECTRODES CONTAINING CO₂ ACTIVATED COCONUT CHAR

(71) Applicant: Corning Incorporated, Corning, NY (US)

(72) Inventors: Kishor Purushottam Gadkaree, Painted Post, NY (US); Atul Kumar, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,457

(22) Filed: Jan. 28, 2014

(65) Prior Publication Data

US 2015/0030527 A1    Jan. 29, 2015

Related U.S. Application Data

(60) Provisional application No. 61/858,929, filed on Jul. 26, 2013.

(51) Int. Cl.
*C01B 31/10* (2006.01)
*H01G 11/34* (2013.01)
(Continued)

(52) U.S. Cl.
CPC .............. *H01G 11/34* (2013.01); *C01B 31/10* (2013.01); *H01G 11/24* (2013.01); *H01G 11/44* (2013.01); *C01P 2004/61* (2013.01);
(Continued)

(58) Field of Classification Search
CPC ...... B01J 20/00; B01J 20/28; B01J 20/28007; B01J 20/2805; B01J 20/28016; B01J 20/28069; B01J 20/28071; B01J 20/28073; B01J 20/28076; B01J 20/28078; B01J 20/2808; B01J 20/28083; B01J 20/20; H01M 4/583; C01B 31/125; C01B 31/083
USPC .................. 502/416–417; 429/231.8
See application file for complete search history.

(56) References Cited

U.S. PATENT DOCUMENTS 6,475,461 B1    11/2002    Ohsaki et al.
6,827,879 B2 *  12/2004    Shinozaki et al. ............. 252/502
(Continued)

FOREIGN PATENT DOCUMENTS

EP    1 211 702    7/2006
WO    2011091092   7/2011

OTHER PUBLICATIONS

Hahn, M., et al. "A dilatometric study of the voltage limitation of carbonaceous electrodes in aprotic EDLC type electrolytes by charge-induced strain." Carbon 44.12 (2006): 2523-2533.*
(Continued)

*Primary Examiner* — Richard M Rump
(74) *Attorney, Agent, or Firm* — John L. Haack; Michael W. Russell

(57) ABSTRACT

A method for producing activated carbon includes heating a coconut shell carbon precursor at a carbonization temperature effective to form a carbon material, and reacting the carbon material with $CO_2$ at an activation temperature effective to form the activated carbon. The resulting activated carbon can be incorporated into a carbon-based electrode of an EDLC. Such EDLC can exhibit a potential window and thus an attendant operating voltage of greater than 3V.

17 Claims, 4 Drawing Sheets

(51) Int. Cl.
*H01G 11/24* (2013.01)
*H01G 11/44* (2013.01)

(52) U.S. Cl.
CPC ........ *C01P 2006/14* (2013.01); *C01P 2006/16* (2013.01); *Y02E 60/13* (2013.01)

(56) References Cited

U.S. PATENT DOCUMENTS

| | | | |
|---|---|---|---|
| 7,091,156 B2 | 8/2006 | Hirahara et al. | 502/416 |
| 7,625,839 B2 * | 12/2009 | Hirahara et al. | 502/432 |
| 7,799,733 B2 | 9/2010 | Wagh et al. | 502/427 |
| 8,198,210 B2 | 6/2012 | Gadkaree et al. | |
| 8,318,356 B2 | 11/2012 | Gadkaree et al. | |
| 8,329,341 B2 | 12/2012 | Gadkaree et al. | |
| 8,405,955 B2 | 3/2013 | Gadkaree et al. | |
| 8,482,900 B2 | 7/2013 | Gadkaree et al. | |
| 8,482,901 B2 | 7/2013 | Gadkaree et al. | |
| 8,564,934 B2 | 10/2013 | Gadkaree et al. | |
| 8,576,541 B2 | 11/2013 | Gadkaree et al. | |
| 8,593,787 B2 | 11/2013 | Gadkaree et al. | |
| 8,784,764 B2 | 7/2014 | Gadkaree et al. | |
| 8,809,231 B2 | 8/2014 | Liu et al. | |
| 8,842,417 B2 | 9/2014 | Gadkaree et al. | |
| 2002/0114126 A1 | 8/2002 | Hirahara et al. | 361/302 |
| 2005/0221981 A1 | 10/2005 | Wagh et al. | 502/423 |
| 2008/0180881 A1 * | 7/2008 | Feaver et al. | 361/502 |
| 2010/0189881 A1 | 7/2010 | Patibandla | |
| 2012/0085708 A1 * | 4/2012 | Redding | C01B 31/08 210/670 |

OTHER PUBLICATIONS

"Phenolic Resins" <http://wpage.unina.it/avitabil/testi/PheForm.pdf> Available Feb. 12, 2009. Accessed May 15, 2014.*

Hu, Zhonghua, M. P. Srinivasan, and Yaming Ni. "Novel activation process for preparing highly microporous and mesoporous activated carbons." Carbon 39.6 (2001): 877-886.*

Liu, Chun-Ling, et al. "Some effects of textural properties of carbon fibers from phenolic resins on double-layer capacitance in aprotic electrolyte." Journal of the Electrochemical Society 155.6 (2008): F124-F131.*

Daud, Wan Mohd Ashri Wan, and Wan Shabuddin Wan Ali. "Comparison on pore development of activated carbon produced from palm shell and coconut shell." Bioresource Technology 93.1 (2004): 63-69.*

Li, Wei, et al. "Effects of carbonization temperatures on characteristics of porosity in coconut shell chars and activated carbons derived from carbonized coconut shell chars." Industrial Crops and Products 28.2 (2008): 190-198.*

A.G. Pandolfo, et al., "Carbon properties and their role in supercapacitors", *Journal of Power Sources*, 2006, vol. 157, pp. 11-27.

PCT/US2014/047722 Search Report.

* cited by examiner

HIGH VOLTAGE EDLC ELECTRODES CONTAINING $CO_2$ ACTIVATED COCONUT CHAR

CROSS-REFERENCE TO RELATED APPLICATIONS

This application claims the benefit of priority under 35 U.S.C. §119 of U.S. Application Ser. No. 61/858,929 filed on Jul. 26, 2013, the entire content of which is hereby incorporated by reference.

BACKGROUND

1. Field

The present disclosure relates generally to methods for forming activated carbon, and more specifically to physical activation of coconut char-based carbon using carbon dioxide and to high voltage EDLCs having carbon-based electrodes that comprise such activated carbon.

2. Technical Background

Energy storage devices such as ultracapacitors may be used in a variety of applications such as where a discrete power pulse is required. Example applications range from cell phones to hybrid vehicles. Ultracapacitors also known as electrochemical double layer capacitors (EDLCs) have emerged as an alternative or compliment to batteries in applications that require high power, long shelf life, and/or long cycle life. Ultracapacitors typically comprise a porous separator and an organic electrolyte sandwiched between a pair of carbon-based electrodes. The energy storage is achieved by separating and storing electrical charge in the electrochemical double layers that are created at the interfaces between the electrodes and the electrolyte. Important characteristics of these devices are the energy density and power density that they can provide, which are both largely determined by the properties of the carbon that is incorporated into the electrodes.

Carbon-based electrodes suitable for incorporation into energy storage devices are known. Activated carbon is widely used as a porous material in ultracapacitors due to its large surface area, electronic conductivity, ionic capacitance, chemical stability, and/or low cost. Activated carbon can be made from synthetic precursor materials such as phenolic resins, or natural precursor materials such as coals and biomass. With both synthetic and natural precursors, the activated carbon can be formed by first carbonizing the precursor and then activating the intermediate product. The activation can comprise physical (e.g., steam) or chemical activation at elevated temperatures to increase the porosity and hence the surface area of the carbon.

Both physical and chemical activation processes typically involve large thermal budgets to heat and react the carbonized material with the activating agent. In the case of chemical activation, corrosive by-products can be formed when a carbonized material is heated and reacted with an activating agent such as KOH. Additionally, phase changes that may occur during the heating and reacting of the carbonized material and chemical activating agent can result in undesired agglomeration of the mixture during processing. These drawbacks can add complexity and cost to the overall process, particularly for reactions that are carried out at elevated temperatures for extended periods of time.

Accordingly, it would be advantageous to provide activated carbon materials and processes for forming activated carbon materials using a more economical activation route while also minimizing the technical issues of corrosion and/or agglomeration. The resulting activated carbon materials can possess a high surface area to volume ratio and minimal reactivity, particularly with the organic electrolyte at elevated voltages, and can be used to form carbon-based electrodes that enable efficient, long-life and high energy density devices.

BRIEF SUMMARY

In accordance with embodiments of the present disclosure, activated carbon that is suitable for incorporation into carbon-based electrodes for use in ultracapacitors and other high power density energy storage devices is derived via carbon dioxide activation from a coconut char-based precursor. Compared to chemical activation routes, the $CO_2$-activated carbon described in the present disclosure may provide as much as a 50% reduction in cost.

Activated carbon can be prepared by heating coconut shells at a carbonization temperature effective to form a carbon material, and then reacting the carbon material with carbon dioxide at an activation temperature effective to form activated carbon.

In an embodiment, a method of forming activated carbon comprises carbonizing coconut shell material by heating the coconut shell material at a carbonization temperature effective to form a carbon material, and activating the carbon material by heating the carbon material at an activation temperature while exposing the carbon material to carbon dioxide.

The resulting activated carbon comprises pores having a size of $\leq 1$ nm, which provide a combined pore volume of $\geq 0.2$ $cm^3/g$, pores having a size of from $>1$ nm to $\leq 2$ nm, which provide a combined pore volume of $\geq 0.05$ $cm^3/g$, and $<0.25$ $cm^3/g$ combined pore volume of any pores having a size of $>2$ nm.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
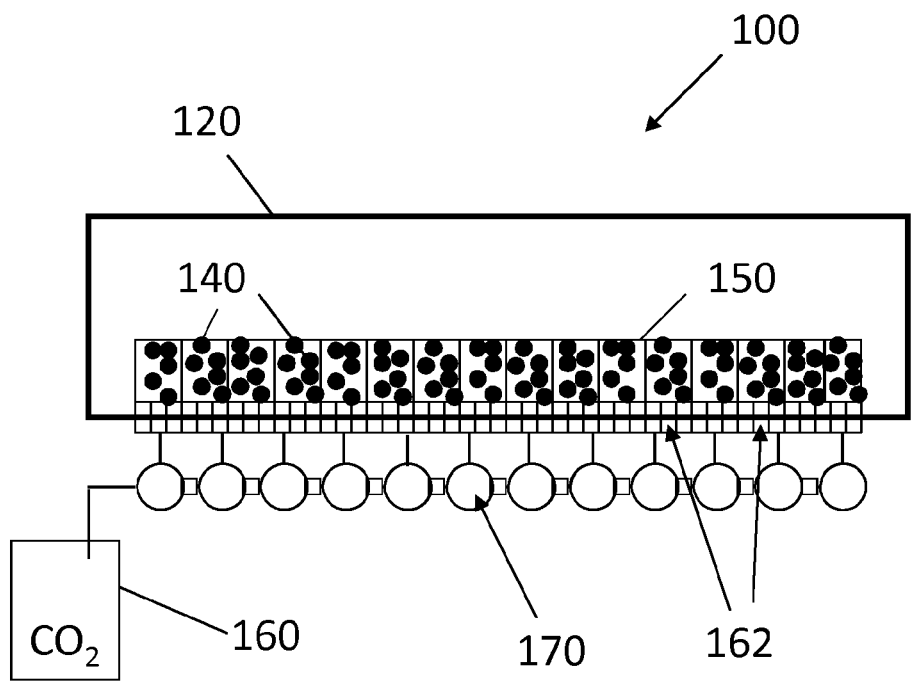
FIG. 1 is a schematic of an example apparatus for forming $CO_2$-activated carbon.

Reference will now be made in greater detail to various embodiments of the subject matter of the present disclosure, some embodiments of which are illustrated in the accompanying drawings. The same reference numerals will be used throughout the drawings to refer to the same or similar parts.

Further to the discussion above, significant issues have been reported when caustic materials, such as KOH, are used for the chemical activation of carbon. For example, when rotary kilns are used in carbon activation, it is often required that the feedstock undergoes calcination and/or drying and/or dehydration prior to treatment at activation temperatures. Agglomeration tends to pose significant issues, such as increased process complexity and/or cost, in continuous processes, for instance, processes employing screw kneaders. As a means to avoid agglomeration issues, other technologies such as roller hearths, have been employed wherein trays are loaded with activation mix material and passed through a multiple zone tunnel furnace. Such furnaces may be costly in operation and may have limited throughput since only one tray level is passed through the furnace at a time. The furnace width is also limiting factor for roller hearths on throughput since roller length spanning across the furnace is limited by material availability and strength at service temperature.

The choice of separator and electrode materials directly affect the performance of the device, including the achievable energy density and power density. The energy density (E) of an EDLC is given by $E=\frac{1}{2} CV^2$, where C is the capacitance and V is the operating voltage. For achieving higher capacitance, activated carbon materials with high surface area (500-2500 $m^2/g$) may be used. More recently, engineered carbon materials have been developed to achieve higher capacitance.

A further approach to increasing the energy density is to increase the capacitor's voltage of operation. In this regard, aqueous electrolytes have been used in EDLCs for lower voltage (<1V) operation, while organic electrolytes have been used for higher voltage (2.3-2.7 V) devices. However, to achieve even higher energy densities, there is a need to increase the voltage envelop from conventional values of about 2.7 V to around 3.0 V. Such an increase from 2.7 to 3.0 V will result in a 23% increase in the energy density.

In order to realize higher energy densities and higher power densities, next generation EDLCs will likely operate at high applied voltages. It may be desirable, therefore, to minimize unwanted Faradaic reactions between the activated carbon and the liquid electrolyte, particularly at the higher applied voltages.

Operation at higher voltages, however, subjects the EDLC components to several different types of stresses that may lead to faster deterioration. Such stresses include, for example, mechanical stresses on the electrodes due to movement of charged ions back-and-forth into the pores of the activated carbon, and chemical stresses due to generation of by-product gases as well as chemical degradation at higher voltages. The chemical stresses are in most part due to Faradic charge transfer processes in the cell.

These Faradic charge transfer processes manifest as oxidation and reduction reactions at each of the positive and negative electrode of the EDLC. It is believed that the properties of the activated carbon impact the Faradic reactions. More specifically, the surface area, surface functional groups and the porosity and pore size distribution of the activated carbon can determine the performance and aging characteristics of the cell.

In view of the foregoing, a method for producing activated carbon comprises heating coconut shell material at a carbonization temperature effective to form coconut char, and reacting the coconut char with $CO_2$ at an activation temperature effective to form the activated carbon.

The activated carbon formed according to the disclosed methods is suitable to form carbon-based electrodes for use in high energy density devices. Advantageously, ultracapacitors made using the inventive carbon-based electrodes may exhibit energy densities that are higher than the energy densities of ultracapacitors made using electrodes derived from commercially-available activated carbon.

A carbon precursor comprising coconut shell material can be carbonized in an inert or reducing atmosphere. An atmosphere suitable for carbonization may be free of oxygen. As an example, whole, cut, or ground (e.g., particulates or powder) coconut shells can be heated at a temperature from about 600° C. to 800° C. (e.g., 600, 650, 700, 750 or 800° C.) for a predetermined time (e.g., 0.5, 1, 2, 4, 8 or more hours) and then optionally cooled. Carbonization is the term for the conversion of the precursor material into carbon or a carbon-containing residue through pyrolysis. During carbonization, the carbon precursor decomposes and forms carbon material. Coconut shell material decomposes to form coconut char. Volatiles released during the carbonization of coconut shell material include $CH_4$, $CO_2$ and water vapor, which typically comprise about 70 wt. % of the starting material.

Prior to activation, the coconut char can be milled to decrease its particle size. For example, the coconut char can be milled to have an average particle size of less than 200 microns (e.g., from 1 to 10 microns) prior to activation.

The coconut char formed via carbonization can, in turn, be activated by exposure to carbon dioxide. As used herein, activation refers to the process of heating carbonized or pyrolyzed material at an activation temperature during exposure to a $CO_2$-containing atmosphere to produce activated carbon. An example $CO_2$-containing atmosphere comprises $CO_2$ and $N_2$. A further example $CO_2$-containing atmosphere comprises $CO_2$ and steam. A still further example $CO_2$-containing atmosphere comprises $CO_2$, $N_2$ and steam. The activation process generally removes a given volume of material from the material being treated, resulting in an increased surface area.

In embodiments, the $CO_2$ activation process can be performed under a controlled atmosphere using a rotary kiln or other suitable furnace. During activation, the coconut char is simultaneously exposed to $CO_2$ gas at elevated temperature.

The foregoing is illustrated schematically in FIG. 1, which shows an example apparatus 100 for forming $CO_2$-activated carbon. Apparatus 100 includes a furnace 120 and a $CO_2$ source 160 adapted to provide a flow of $CO_2$ via manifold 170 into the furnace. Located within the furnace is a vessel 150 for holding the coconut char. In operation, $CO_2$ is introduced from source 160 via manifold 170 into the furnace where it flows over and reacts with the coconut char 140 to form activated carbon.

In an example process, a $CO_2$ flow rate of about 40 liters/minute can be used to deliver $CO_2$ to the furnace where carbon material is incorporated into reaction vessel 150 via baffles 162 can be used to support the carbon material while permitting passage of the $CO_2$. After reacting the carbon material with $CO_2$ within the furnace 120 at about 975° C. for 2.5 hrs, the furnace can be cooled and the activated carbon optionally processed further.

In various embodiments, the activation temperature can range from about 700° C. to 1100° C. For example the activation temperature can range from about 800° C. to 1000° C., e.g., about 800° C., 850° C., 900° C., 950° C., or 1000° C. The $CO_2$ flow rate during activation can range from about 1 liters/min to about 100 liters/min, e.g., 1, 2, 5, 10, 15, 20, 50 or 100 liters/min. The activation time can range from several minutes to several hours (e.g., 30, 60, 90, 120, 150, 180, 210, 240, 270, 300, 330 or 360 minutes). An example process includes applying an activation temperature of 850° C. for 270 minutes.

The resulting activated carbon can be washed, e.g., with an acidic solution. The washing can reduce the ash content and remove unwanted impurities from the activated carbon. One process for washing the activated carbon involves sequentially rinsing the activated carbon with water and acid. A further washing process involves rinsing the activated carbon with an aqueous acid mixture (e.g., mixture of acid and water). Acids used during the washing can include hydrochloric acid and sulfuric acid. The washing can be performed at a temperature of 90° C.-100° C.

In further embodiments, in addition to or in lieu of washing, the activated carbon can be heated treated in an inert or reducing atmosphere. The optional heat treatment can eliminate or lessen the concentration of oxygen in the activated carbon. For example, such a heat treatment can remove oxygen-containing functional groups from the activated carbon surface. In embodiments, the activated carbon can be treated with both a washing step and a heat treatment, and where both processes are performed, the washing step may be performed either before or after the heat treatment.

One method to reduce oxygen content is to refine (heat) the activated carbon material in an inert environment (such as nitrogen, helium, argon, etc.) or in a reducing environment (such as hydrogen, forming gas, carbon monoxide, etc.).

Activated carbon refining can be performed in a retort furnace (CM Furnaces, Model 1212FL) purged with nitrogen or forming gas. The furnace temperature can be increased at a rate of 200° C./hr. to the desired refining heat treatment temperature (e.g., 500-900° C.), held constant for a suitable time (e.g., 2 hours), and then cooled down to room temperature before exposure to ambient atmosphere.

The minimization of impurities and adsorbed surface groups in the activated carbon via washing and/or heat treatment can decrease the occurrence of unwanted reactions between such species and electrolyte ions during cell operation, particularly at elevated voltages. In some embodiments, the activated carbon includes a total oxygen content of less than 10 wt. %. In additional embodiments, the total oxygen content is less than 9, 8, 7, 6, 5, 4, 3, 2, 1 or 0.5 wt. %.

The activated carbon can comprise micro-, meso- and/or macroscale porosity. As defined herein, microscale pores have a pore size of 2 nm or less, and ultramicropores have a pore size of 1 nm or less. Mesoscale pores have a pore size ranging from 2 to 50 nm. Macroscale pores have a pore size greater than 50 nm. In an embodiment, the activated carbon comprises a majority of microscale pores. As used herein, the term "microporous carbon" and variants thereof means an activated carbon having a majority (i.e., at least 50%) of microscale pores. A microporous, activated carbon material can comprise greater than 50% microporosity (e.g., greater than 50, 55, 60, 65, 70, 75, 80, 85, 90 or 95% microporosity).

According to embodiments, a carbon-based electrode for an EDLC comprises activated carbon having a total porosity greater than about 0.2 $cm^3/g$ (e.g., greater than 0.2, 0.25, 0.3, 0.35, 0.4, 0.45, 0.5, 0.55, 0.6, 0.65, 0.7, 0.75, 0.8, 0.85 or 0.9 $cm^3/g$). In related embodiments, the activation carbon can have a total porosity less than 1 $cm^3/g$ (e.g., less than 1, 0.9, 0.85, 0.8, 0.75, 0.7, 0.65, 0.6, or 0.55 $cm^3/g$). In still further embodiments, the total porosity of the activated carbon can be between any of the foregoing values.

The pore size distribution of the activated carbon can include ultramicropores, micropores, mesopores and macropores and may be characterized as having a unimodal, bimodal or multi-modal pore size distribution. The ultramicropores can comprise 0.2 $cm^3/g$ or more (e.g., 0.2, 0.25, 0.3, 0.35 or 0.4 $cm^3/g$ or more) of the total pore volume and, in related embodiments, populations between any of the foregoing values, e.g., from 0.2 to 0.35 $cm^3/g$ or from 0.25 to 0.3 $cm^3/g$. Pores having a pore size (d) in the range of $1<d\le2$ nm can comprise 0.05 $cm^3/g$ or more (e.g., at least 0.05, 0.1, 0.15, 0.2, 0.25, 0.3, 0.35, 0.4, 0.45 or 0.5 $cm^3/g$) of the total pore volume. Pores having a pore size (d) in the range of $1<d\le2$ nm can comprise 0.55 $cm^3/g$ or less (e.g., less than 0.55, 0.5, 0.45, 0.4 or 0.35 $cm^3/g$) of the total pore volume. In complimentary embodiments, the activated carbon can include pores having a pore size (d) in the range of $1<d\le2$ nm between any of the foregoing values, e.g., from 0.05 to 0.25 $cm^3/g$ or from 0.1 to 0.2 $cm^3/g$. If present, in an embodiment, any pores having a pore size greater than 2 nm, which may include mesopores and/or macropores, can comprise 0.25 $cm^3/g$ or less (e.g., less than 0.25, 0.2, 0.15, 0.1 or 0.05 $cm^3/g$) of the total pore volume. In complimentary embodiments, the activated carbon can include pores having a pore size $d>2$ nm between any of the foregoing values, i.e., from 0.2 to 0.25 $cm^3/g$ or from 0.1 to 0.2 $cm^3/g$. In still further embodiment, the activated carbon can be free of any pores having a pore size greater than 2 nm or free of any pores having a pore size greater than 5 nm.

The activated carbon made using the disclosed method can have a specific surface area greater than about 300 $m^2/g$, i.e., greater than 350, 400, 500 or 1000 $m^2/g$. In embodiments, the average particle size of the activated carbon can be milled to less than 20 microns prior to incorporating the activated carbon into a carbon-based electrode.

A method for producing a carbon-based electrode comprises heating a coconut shell-based carbon precursor at a carbonization temperature effective to form a carbon material, reacting the carbon material with carbon dioxide at an activation temperature effective to form an activated carbon material, and forming a carbon-based electrode from the resulting activated carbon. Prior to forming a carbon-based electrode, the activated carbon material may be dried and optionally ground to form a powder, which can then be incorporated into the electrode-making process.

In a typical electrochemical double layer capacitor (EDLC), a pair of carbon-based electrodes is separated by a porous separator and the electrode/separator/electrode stack is infiltrated with a liquid organic or inorganic electrolyte. The electrodes comprise activated carbon that has been mixed with other additives (e.g., binders) and compacted into a thin sheet and laminated to a conductive metal current collector backing.

Optionally, in conjunction with the foregoing methods, the activated carbon can be mixed with carbon black and/or a polymeric binder such as polytetrafluoroethylene (PTFE) or other suitable binder and compacted to form the carbon-based electrodes.

By way of example, a carbon paper having a thickness in the range of about 100-300 micrometers can be prepared by rolling and pressing a powder mixture comprising 60-90 wt. % activated carbon, 5-20 wt. % carbon black and 5-20 wt. % PTFE. The carbon-based electrodes can be rolled into jelly roll using a cellulosic separator, and then placed into an aluminum can.

The present disclosure also relates to an electrochemical device, such as an electrochemical double layer capacitor (EDLC), comprising at least one carbon-based electrode that includes the activated carbon material described herein.

Ultracapacitors typically comprise two porous electrodes that are isolated from electrical contact with each other by a porous dielectric separator. The separator and the electrodes are impregnated with an electrolytic solution that allows ionic current to flow between the electrodes while preventing electronic current from discharging the cell. Each porous electrode is typically in electrical contact with a current collector. The current collector, which can comprise a sheet or plate of electrically-conductive material (e.g., aluminum) can reduce ohmic losses while providing physical support for the porous electrode (activated carbon) material.

According to a further embodiment, an electrochemical cell comprises at least a first electrode comprising an activated carbon material as disclosed herein, a porous separator, and a pair of electrically conductive substrates, wherein the porous separator is disposed between the first electrode and a second electrode, and the first and second electrodes are each in electrical contact with a respective electrically conductive substrate.

Figure 2:
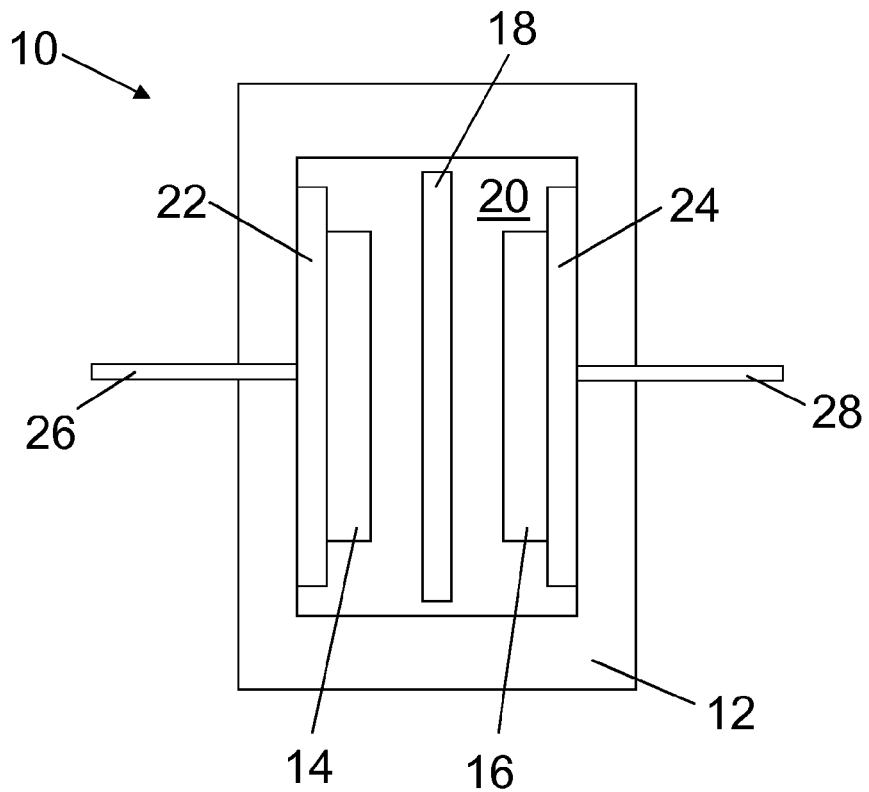
FIG. 2 is a schematic illustration of an example ultracapacitor.

FIG. 2 is a schematic illustration of an example ultracapacitor. Ultracapacitor 10 includes an enclosing body 12, a pair of current collectors 22, 24, a positive electrode 14 and a negative electrode 16 each respectively formed over one of the current collectors, and a porous separator layer 18. Electrical leads 26, 28 can be connected to respective current collectors 22, 24 to provide electrical contact to an external device. Electrodes 14, 16 comprise porous activated carbon layers that are formed over the current collectors. A liquid electrolyte 20 is contained within the enclosing body and incorporated throughout the porosity of both the porous separator layer and each of the porous electrodes. In embodiments, individual ultracapacitor cells can be stacked (e.g., in series) to increase the overall operating voltage.

The enclosing body 12 can be any known enclosure means commonly-used with ultracapacitors. The current collectors 22, 24 generally comprise an electrically-conductive material such as a metal, and commonly are made of aluminum due to its electrical conductivity and relative cost. For example, current collectors 22, 24 may be thin sheets of aluminum foil.

Porous separator 18 electronically insulates the carbon-based electrodes 14, 16 from each other while allowing ion diffusion. The porous separator can be made of a dielectric material such as cellulosic materials, glass, and inorganic or organic polymers such as polypropylene, polyesters or polyolefins. In embodiments, a thickness of the separator layer can range from about 10 to 250 microns.

The electrolyte 20 serves as a promoter of ion conductivity, as a source of ions, and may serve as a binder for the carbon. The electrolyte typically comprises a salt dissolved in a suitable solvent. Suitable electrolyte salts include quaternary ammonium salts such as those disclosed in commonly-owned U.S. patent application Ser. No. 13/682,211, the disclosure of which is incorporated herein by reference. Example quaternary ammonium salts include tetraethylammonium tetrafluoroborate (($Et)_4NBF_4$) or triethylmethyl ammonium tetrafluoroborate ($Me(Et)_3NBF_4$).

Example solvents for the electrolyte include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. In embodiments, the electrolyte includes a polar aprotic organic solvent such as a cyclic ester, chain carbonate, cyclic carbonate, chain ether and/or cyclic ether solvent. Example cyclic esters and chain carbonates have from 3 to 8 carbon atoms, and in the case of the cyclic esters include β-butyro-lactone, γ-butyrolactone, γ-valerolactone and δ-valerolactone. Examples of the chain carbonates include dimethyl carbonate, diethyl carbonate, dipropyl carbonate, ethylene carbonate, methyl ethyl carbonate, methyl propyl carbonate and ethyl propyl carbonate. Cyclic carbonates can have from 5 to 8 carbon atoms, and examples include 1,2-butylene carbonate, 2,3-butylene carbonate, 1,2-pentene carbonate, 2,3-pentene carbonate and propylene carbonate. Chain ethers can have 4 to 8 carbon atoms. Example chain ethers include dimethoxyethane, diethoxyethane, methoxyethoxyethane, dibutoxyethane, dimethoxypropane, diethoxypropane and methoxyethoxypropnane. Cyclic ethers can have from 3 to 8 carbon atoms. Example cyclic ethers include tetrahydrofuran, 2-methyl-tetrahydrofuran, 1,3-dioxolan, 1,2-dioxolan, 2-methyldioxolan and 4-methyldioxolan. A combination of two or more solvents may also be used.

As examples, an assembled EDLC can comprise an organic liquid electrolyte such as tetraethylammonium tetrafluoroborate (TEA-TFB) or triethylmethylammonium tetrafluoroborate (TEMA-TFB) dissolved in an aprotic solvent such as acetonitrile.

Ultracapacitors may have a jelly roll design, prismatic design, honeycomb design, or other suitable configuration. A carbon-based electrode made according to the present disclosure can be incorporated into a carbon-carbon ultracapacitor or into a hybrid ultracapacitor. In a carbon-carbon ultracapacitor, both of the electrodes are carbon-based electrodes. In a hybrid ultracapacitor, one of the electrodes is carbon-based, and the other electrode can be a pseudo capacitive material such as lead oxide, ruthenium oxide, nickel hydroxide, or another material such as a conductive polymer (e.g., parafluorophenyl-thiophene).

In carbon-carbon ultracapacitors, the activated carbon in each electrode may have the same, similar or distinct properties. For example, the pore size distribution of the activated carbon incorporated into a positive electrode may be different than the pore size distribution of the activated carbon incorporated into a negative electrode.

Within an individual ultracapacitor cell, and under the influence of an applied electric potential, an ionic current flows due to the attraction of anions in the electrolyte to the positive electrode and cations to the negative electrode. Ionic charge can accumulate at each of the electrode surfaces to create charge layers at the solid-liquid interfaces. The accumulated charge is held at the respective interfaces by opposite charges in the solid electrode to generate an electrode potential.

During discharge of the cell, a potential across the electrodes causes ionic current to flow as anions are discharged from the surface of the positive electrode and cations are discharged from the surface of the negative electrode. Simultaneously, an electronic current can flow through an external circuit located between the current collectors. The external circuit can be used to power electrical devices.

The amount of charge stored in the layers impacts the achievable energy density and power density of the capacitor. The performance (energy and power density) of an ultracapacitor depends largely on the properties of the activated carbon that makes up the electrodes. The properties of the activated carbon, in turn, can be gauged by evaluating, for example, the porosity and pore size distribution of the activated carbon, as well as the impurity content within the activated carbon, such as nitrogen or oxygen. Relevant electrical properties include the potential window, area-specific resistance and the volumetric capacitance.

When incorporated into an ultracapacitor, the activated carbon according to the present disclosure may, in some embodiments, exhibit operating voltages up to 3.2 V (e.g., 2.7, 2.8, 2.9, 3.0, 3.1 or 3.2 V) and a volumetric capacitance of greater than 50 F/cm$^3$ (e.g., greater than 50, 60, 70, or 80 F/cm$^3$), including capacitance values between any of the foregoing values. Without wishing to be bound by theory, the high potential window is believed to be the result of the low reactivity of the activated carbon, which may be attributable to a low concentration of oxygen-containing functional groups within the material.

EXAMPLES

Various embodiments will be further clarified by the following examples.

The coconut shell-based activated carbon materials disclosed in various examples were produced by initially carbonizing coconut shell material in nitrogen at ~800° C. and grinding the resulting coconut char in a jet mill to an average particle size (D50) of about 5 microns. The carbon material was activated using a box or rotary furnace in conjunction with a nitrogen purge and a temperature ramp rate of 150° C./hr from 23° C. to an activation temperature ($T_{act}$). The resulting activated carbon materials were washed sequentially with water, acid (HCl), and water, followed by heat treatment in forming gas at 900° C. to reduce the oxygen content.

To form carbon-based electrodes, the activated carbon was combined with PTFE and carbon black at a weight ratio of activated carbon:PTFE:carbon black of 85:10:5. The mixture was initially combined using a Henschel high speed mixer and then the PTFE was fibrillated using a ball mill, jet mill or twin screw extruder.

The fibrillated mixture of activated carbon, PTFE and carbon black was calendared to form a carbon paper. The typical sheet thickness was about 100 microns. Carbon-based electrodes were made by laminating activated carbon-containing sheets (approx. 1.5 cm×2 cm) onto an aluminum foil (25 microns thick) current collector.

After drying the carbon-based electrodes overnight at 120° C. in a vacuum oven, test cells were assembled in a glove box filled with dry argon gas. Cells were made by sandwiching a piece of cellulose separator between two carbon-based electrodes. The carbon-based electrodes, together with a cellulose separator, were wound into jelly rolls and vacuum dried (130° C. for 48 hrs at <0.05 Torr) within an ELDC case. A liquid electrolyte was incorporated into the case, which was sealed to form an EDLC device. The electrolyte included 1.2M tetraethylammonium tetrafluoroborate (TEA-TFB) in acetonitrile or triethylmethyl ammonium tetrafluoroborate (TEMA-TFB) in acetonitrile.

Limiting reduction potential and limiting oxidation potential measurements were performed after soaking each test cell in liquid electrolyte. The potential window (or electrochemical window) is the voltage range over which the cell materials (e.g., carbon-based electrode material and/or liquid electrolyte) is neither reduced nor oxidized. Electrochemical double layer capacitors (EDLCs) that include the activated carbon materials as disclosed herein can have a potential window of at least 3V (e.g., at least 3, 3.2 or 3.5 V) and/or a volumetric capacitance of at least 35 F/cc (e.g., at least 35, 40, 45, 50, 55, 60, 65, 70, 75 or 80 F/cc). In related embodiments, the potential window and the volumetric capacitance can each be characterized over a range between any of the foregoing values.

The electrochemical measurements were conducted on button cells using a Gamry Instruments potentiostat/galvostat with Framework 5 software. The limiting reduction potential and limiting oxidation potential were measured via cyclic voltammetry at a scan rate of 5 mV/s in TEA-TFB electrolyte. In the measurements, a potential is applied between the reference electrode and the working electrode and the current is measured between the working electrode and the counter electrode. In the current versus voltage traces, the current will increase as the potential reaches the reduction potential of the electrode, but then falls off as the concentration of the electrolyte is depleted close to the electrode surface. The limiting reduction and oxidation potentials were determined by differentiating a plot of current versus voltage. Summarized below are the limiting potential measurements for example test cells that include inventive and comparative activated carbon.

Figure 7:
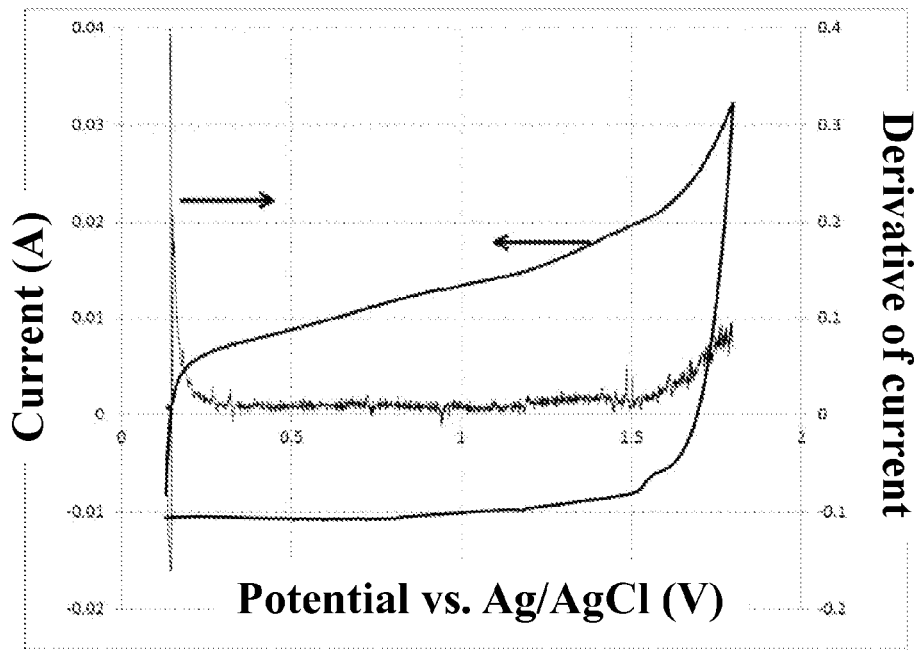
FIG. 7 is a plot of current versus voltage for a carbon-based electrode including activated carbon material according to one embodiment.

According to one embodiment, FIG. 7 show cyclic voltammogram traces for activated-carbon test cells comprising activated carbon made from coconut char and activated using carbon dioxide (Example 10). The test simulates the performance of the carbon in the positive electrode. In the illustrated traces, the vertex potential is set at +1.8 V. It can be seen that the current levels off at about 23 mA, and that the current starts to increase at about 1.6 V. This implies that there are faradic oxidation reactions that cause the current to increase at that voltage. FIG. 7 also shows the differentiated plot, which indicates that the limiting oxidation potential is about 1.6 V versus the Ag/AgCl reference electrode.

Figure 8:
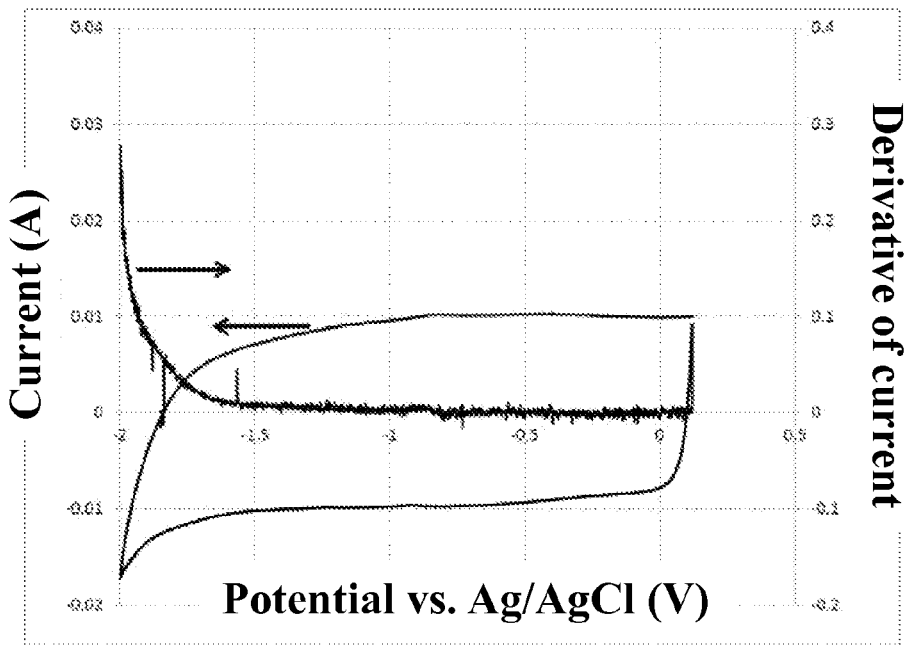
FIG. 8 is a plot of current versus voltage for a carbon-based electrode including activated carbon material according to a further embodiment.

FIG. 8 shows cyclic voltammogram traces for further Example 10 electrodes. This test simulates the performance of the carbon in the negative electrode. It can be seen that currents slightly decreases with potential, and that a high rate of change in the current occurs at about −1.6 V versus Ag/AgCl reference electrode. Thus, the limiting reduction potential is about −1.6 V versus the Ag/AgCl reference electrode.

A summary of potential window data for test cells comprising different activated carbon materials is shown in Table 1.

As seen with reference to the data, the activated carbon of Example 10 exhibits lower reactivity with the electrolyte, which enables higher voltage stability. From the above cyclic voltammograms test data, the Example 10 carbon has a total potential window of 3.2V, which represents the sum of the absolute values for the limiting potentials from the respective negative and positive electrodes (=1.6 V−(−1.6 V)).

TABLE 1

Performance of Activated Carbon using different Activation Conditions

| Ex. | Precursor | Activation | $C_v$ [F/cc] | Potential Window [V] |
|---|---|---|---|---|
| 1 | coconut shell | OC-900° C., 2 hr, $CO_2$ | 74.6 | |
| 2 | coconut shell | OC-850° C., 3 hr, $CO_2$ | 79.0 | |
| 3 | coconut shell | OC-850° C., 3.5 hr, $CO_2$ | 77.0 | |
| 4 | coconut shell | OC-850° C., 3.25 hr, $CO_2$ | 77.7 | |
| 5 | coconut shell | CR-850° C., 3 hr, 1 L/min $CO_2$, 3 rpm | 73.0 | |
| 6 | coconut shell | CR-850° C., 3.5 hr, 1 L/min $CO_2$, 3 rpm | 74.7 | |
| 7 | coconut shell | CR-850° C., 4 hr, 1 L/min $CO_2$, 1.5 rpm | 77.8 | |
| 8 | coconut shell | CR-850° C., 4.5 hr, 1 L/min $CO_2$, 1.5 rpm | 75.6 | |
| 9 | coconut shell | CR-850° C., 3.5 hr, 1 L/min $CO_2$, 1.5 rpm | 76.8 | |
| 10 | coconut shell | CR-850° C., 4.25 hr, 1 L/min $CO_2$, 1.5 rpm | 80.2 | 3.2 |
| 11 | coconut shell | CR-850° C., 3.75 hr, 1 L/min $CO_2$, 1.5 rpm | 78.9 | |
| 12 | coconut shell | CR-850° C., 3.75 hr, 1 L/min $CO_2$ + $N_2$ 1.5 rpm | — | |
| A# | novolac resin | carbon dioxide | | 3.5 |
| B# | resole resin | carbon dioxide | | 3.0 |
| C# | wheat flour | carbon dioxide | | 2.9 |
| D# | ground coconut shell | steam | | 2.9 |
| E# | wheat flour | KOH | | 2.9 |
| F# | novolac resin | KOH | | 3.0 |

Examples A-F are comparative

Example 1

Ground coconut char (10 g) was activated in box furnace at 900° C. for 2 hours during which time the chamber was flooded with $CO_2$. In a button cell with 1.5M TEA-TFB electrolyte in acetonitrile solvent, the activated carbon had a volumetric capacitance of 74.6 F/cc.

Example 2

Ground coconut char (10 g) was activated in box furnace at 850° C. for 3 hours during which time the chamber was flooded with $CO_2$. In a button cell with 1.5M TEA-TFB electrolyte in acetonitrile solvent, the activated carbon had a volumetric capacitance of 79.0 F/cc.

Example 3

Ground coconut char (10 g) was activated in box furnace at 850° C. for 3.5 hours during which time the chamber was flooded with $CO_2$. In a button cell with 1.5M TEA-TFB electrolyte in acetonitrile solvent, the activated carbon had a volumetric capacitance of 77.0 F/cc.

Example 4

Figure 3:
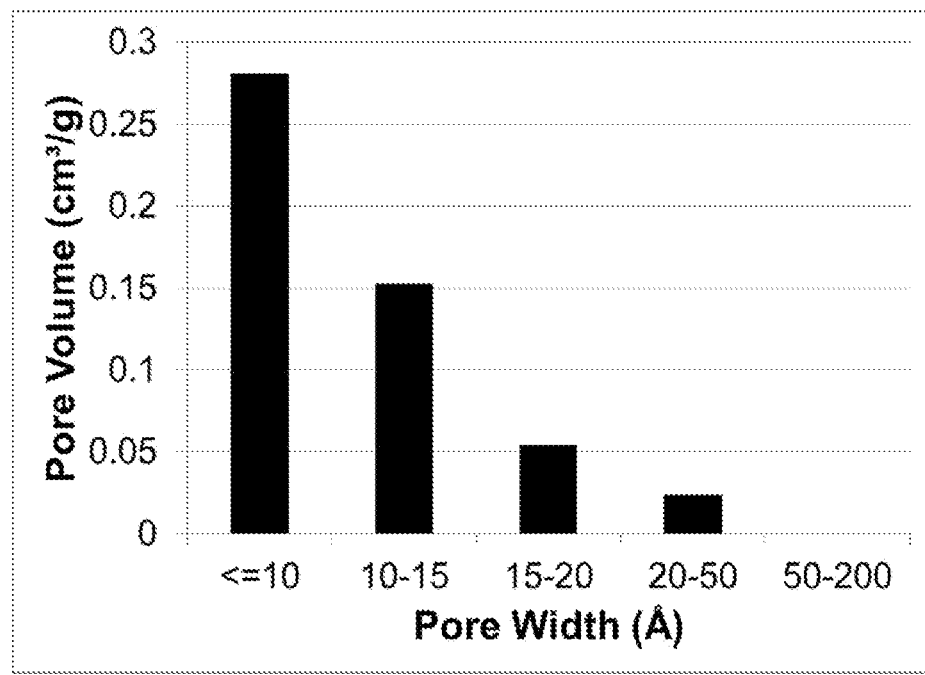
FIG. 3 is a pore size distribution histogram of an activated carbon material according to one embodiment.

Ground coconut char (10 g) was activated in box furnace at 850° C. for 3.25 hours during which time the chamber was flooded with $CO_2$. In a button cell with 1.5M TEA-TFB electrolyte in acetonitrile solvent, the activated carbon had a volumetric capacitance of 77.7 F/cc. The pore size distribution of the activated carbon is shown in FIG. 3, and indicates high level of micro-porosity in the carbon.

Example 5

Figure 4:
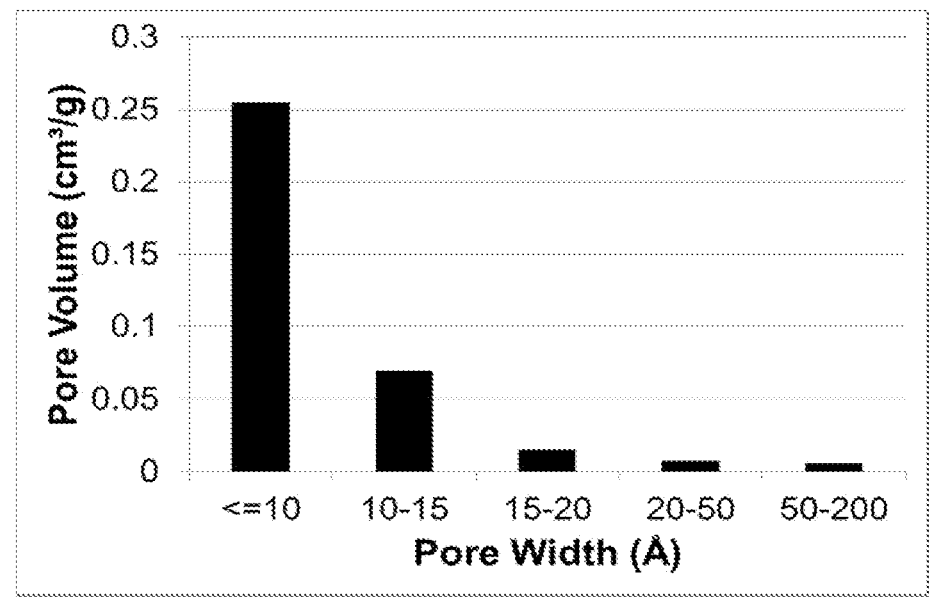
FIG. 4 is a pore size distribution histogram of an activated carbon material according to a further embodiment.

Ground coconut char (20 g) was activated in rotary furnace at 850° C. for 3 hours at 3 rpm with a $CO_2$ flow rate of 1 liter/min. In a button cell with 1.5M TEA-TFB electrolyte in acetonitrile solvent, the activated carbon had a volumetric capacitance of 73.0 F/cc. The pore size distribution of the activated carbon is shown in FIG. 4, and indicates high level of micro-porosity in the carbon.

Example 6

Figure 5:
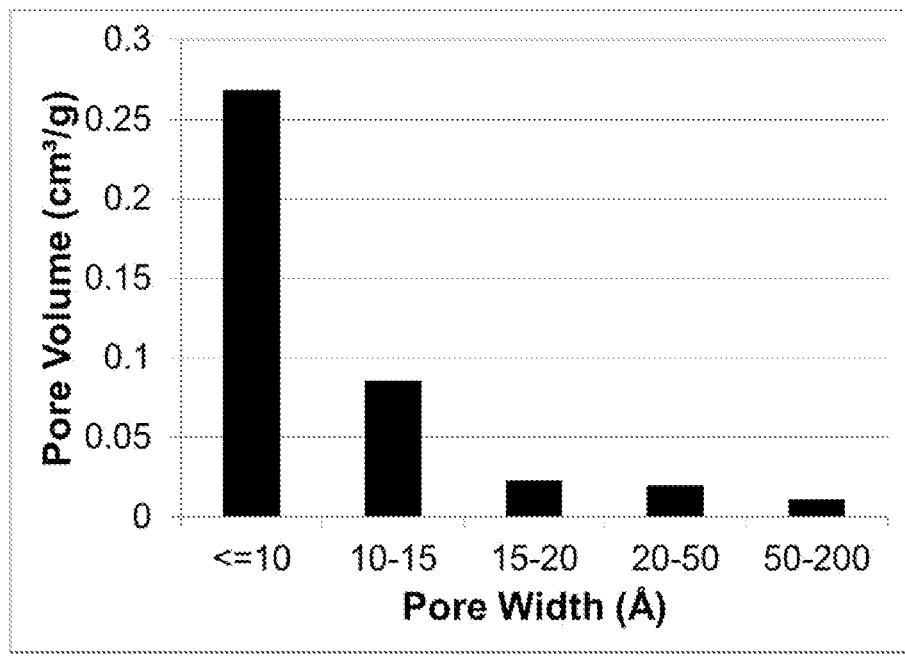
FIG. 5 is a pore size distribution histogram of an activated carbon material according to a further embodiment.

Ground coconut char (20 g) was activated in rotary furnace at 850° C. for 3.5 hours at 3 rpm with a $CO_2$ flow rate of 1 liter/min. In a button cell with 1.5M TEA-TFB electrolyte in acetonitrile solvent, the activated carbon had a volumetric capacitance of 74.7 F/cc. The pore size distribution of the activated carbon is shown in FIG. 5, and indicates high level of micro-porosity in the carbon.

Example 7

Figure 6:
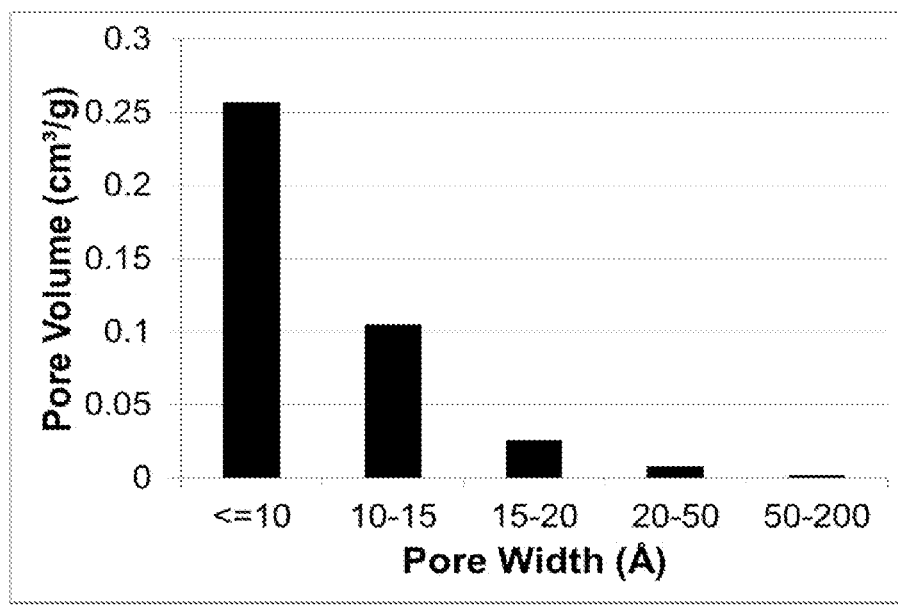
FIG. 6 is a pore size distribution histogram of an activated carbon material according to a still further embodiment.

Ground coconut char (20 g) was activated in rotary furnace at 850° C. for 4 hours at 1.5 rpm with a $CO_2$ flow rate of 1 liter/min. In a button cell with 1.5M TEA-TFB electrolyte in acetonitrile solvent, the activated carbon had a volumetric capacitance of 77.8 F/cc. The pore size distribution of the activated carbon is shown in FIG. 6, and indicates high level of micro-porosity in the carbon.

The activated carbon was washed and filtered in dilute HCl and deionized water until the effluent was pH neutral. The washed activated carbon was heated in flowing forming gas ($N_2$ with 1% $H_2$) at 900° C. The resultant carbon was designated as Sample 7A.

The activated carbon was analyzed for total oxygen content using an laser-induced breakdown spectroscopy (LIBS). The content of oxygen-containing surface functional groups was measured using Boehm titration. Results are summarized in Table 2 together with oxygen content data from comparative Example D (Sample D).

TABLE 2

Oxygen and surface functional group content of activated carbon

| Ex. | Oxygen content [wt. %] | Carboxylic + Anhydride [mmol/g] | Lactone + Lactol [mmol/g] | Hydroxyl [mmol/g] | BET [$m^2$/g] | DFT pore volume [$cm^3$/g] |
|---|---|---|---|---|---|---|
| 7A | 0.32 | 0 | 0 | 0.11 | 1234 | 0.40 |
| D# | 1.37 | 0 | 0.05 | 0.11 | 1708 | 0.60 |

Sample 7A has a lower total oxygen content than Sample D. Furthermore, Sample 7A is free of carboxylic, carboxylic anhydride, lactone and lactol surface functional groups.

Note that the three types of functional groups are electrochemically reactive with decreasing reactivity from left to right as shown in Table 2.

Pore size data are determined using $N_2$ adsorption on a Micrometrics ASAP 2420 and calculated using the Density Functional Theory (DFT) assuming slit pores. Sample 7A has a lower pore volume and a surface area compared to Sample D.

Example 8

Ground coconut char (20 g) was activated in rotary furnace at 850° C. for 4.5 hours at 1.5 rpm with a $CO_2$ flow rate of 1 liter/min. In a button cell with 1.5M TEA-TFB electrolyte in acetonitrile solvent, the activated carbon had a volumetric capacitance of 75.6 F/cc. The pore size distribution of the activated carbon is shown in FIG. 6, and indicates high level of micro-porosity in the carbon.

Example 9

Ground coconut char (20 g) was activated in rotary furnace at 850° C. for 3.5 hours at 1.5 rpm with a $CO_2$ flow rate of 1 liter/min. In a button cell with 1.5M TEA-TFB electrolyte in acetonitrile solvent, the activated carbon had a volumetric capacitance of 76.8 F/cc.

Example 10

Ground coconut char (20 g) was activated in rotary furnace at 850° C. for 4.25 hours at 1.5 rpm with a $CO_2$ flow rate of 1 liter/min. In a button cell with 1.5M TEA-TFB electrolyte in acetonitrile solvent, the activated carbon had a volumetric capacitance of 80.2 F/cc.

Example 11

Ground coconut char (20 g) was activated in rotary furnace at 850° C. for 3.75 hours at 1.5 rpm with a $CO_2$ flow rate of 1 liter/min. In a button cell with 1.5M TEA-TFB electrolyte in acetonitrile solvent, the activated carbon had a volumetric capacitance of 78.9 F/cc.

Comparative Examples A-F

Comparative Example A was derived from novolac phenol formaldehyde resin using $CO_2$ activation. Comparative Example B was derived from resole phenol formaldehyde resin using $CO_2$ activation. Comparative Example C was derived from wheat flour powder using $CO_2$ activation. Comparative Example D was derived from coconut shell powder using steam activation. Comparative Example E was derived from wheat flour powder using KOH chemical activation. Comparative Example F was derived from novolac phenol formaldehyde using KOH chemical activation.

As used herein, the singular forms "a," "an" and "the" include plural referents unless the context clearly dictates otherwise. Thus, for example, reference to a "carbon precursor" includes examples having two or more such "carbon precursors" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a carbon precursor that comprises coconut shell material include embodiments where the carbon precursor consists of coconut shell material and embodiments where the carbon precursor consists essentially of coconut shell material.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

We claim:

1. A method of forming activated carbon, comprising:
   carbonizing coconut shell material by heating the coconut shell material at a carbonization temperature effective to form a coconut char; and
   activating the coconut char to form activated carbon by heating the coconut char at an activation temperature while exposing the coconut char to carbon dioxide, wherein the activated carbon comprises
   pores having a size of ≤1 nm, which provide a combined pore volume of ≥0.2 $cm^3/g$;
   pores having a size of from >1 nm to ≤2 nm, which provide a combined pore volume of ≥0.05 $cm^3/g$; and
   <0.05 $cm^3/g$ combined pore volume of any pores having a size of >2 nm.

2. The method according to claim 1, wherein the coconut shell material comprises powdered coconut shells.

3. The method according to claim 1, wherein the carbonization temperature is from 600-800° C.

4. The method according to claim 1, wherein the activation temperature is from 700-1000° C.

5. The method according to claim 1, wherein the carbon material has an average particle size of less than 200 microns prior to activation.

6. The method according to claim 1, wherein the coconut char has an average particle size of from 1 to 10 microns prior to activation.

7. The method according to claim 1, further comprising modifying the average particle size of the activated carbon to less than 20 microns.

8. The method according to claim 1, wherein the pores having a size of ≤1 nm provide a combined pore volume of 0.2 to 0.35 $cm^3/g$.

9. The method according to claim 1, wherein the pores having a size of from >1 nm to ≤2 nm provide a combined pore volume of from 0.05 to 0.25 $cm^3/g$.

10. The method according to claim 1, wherein the pores having a size of from >1 nm to ≤2 nm provide a combined pore volume of from 0.1 to 0.2 cm$^3$/g.

11. The method according to claim 1, wherein the activated carbon is free of any pores having a size of >2 nm.

12. The method according to claim 1, wherein the activated carbon comprises a total pore volume of ≥0.3 cm$^3$/g.

13. The method according to claim 1, wherein the activated carbon comprises a total pore volume of ≥0.4 cm$^3$/g.

14. The method according to claim 1, where the activated carbon comprises a total oxygen content of less than 10 wt %.

15. The method according to claim 1, wherein the pores having a size of ≤1 nm provide a combined pore volume of 0.3 to 0.4 cm$^3$/g.

16. The method according to claim 1, wherein the activated carbon comprises a total pore volume of ≥0.5 cm$^3$/g.

17. A method of forming activated carbon, comprising:
carbonizing coconut shell material by heating the coconut shell material at a carbonization temperature effective to form a carbon material; and
activating the carbon material by heating the carbon material at an activation temperature while exposing the carbon material to carbon dioxide, wherein the activated carbon comprises
pores having a size of ≤1 nm, which provide a combined pore volume of ≥0.2 cm$^3$/g;
pores having a size of from >1 nm to ≤2 nm, which provide a combined pore volume of ≥0.05 cm$^3$/g; and
<0.25 cm$^3$/g combined pore volume of any pores having a size of >2 nm,
wherein the carbon material has an average particle size ranging from 1 to 10 microns prior to activation.

* * * * *